United States Patent [19]

Shelton

[11] 4,059,283
[45] Nov. 22, 1977

[54] THREE-POINT TRACTOR LINKAGE

[75] Inventor: Peter Alfred Shelton, Capdella, Spain

[73] Assignee: Fiat Trattori S.p.A., Modena, Italy

[21] Appl. No.: 630,783

[22] Filed: Nov. 10, 1975

Related U.S. Application Data

[63] Continuation of Ser. No. 418,041, Nov. 29, 1973, abandoned.

[30] Foreign Application Priority Data

Nov. 22, 1972 United Kingdom ............... 53937/72
June 25, 1973 United Kingdom ............... 30095/73

[51] Int. Cl.² .............................................. B60D 1/16
[52] U.S. Cl. ................................. 280/461 A; 280/468
[58] Field of Search ............... 280/468, 461 R, 461 A, 280/479 R, 405 B, 406 R, 446 R, 446 A, 456 A; 172/439, 444, 450, 484, 464, 679

[56] References Cited

U.S. PATENT DOCUMENTS

| | | | |
|---|---|---|---|
| 2,360,902 | 10/1944 | Simmons | 280/461 R X |
| 2,393,358 | 1/1946 | Ferguson | 280/461 R |
| 2,441,630 | 5/1948 | Heitshu | 280/461 R |
| 2,653,825 | 9/1953 | Collins | 280/456 A |
| 3,105,705 | 10/1963 | Richard | 280/461 R |
| 3,432,184 | 3/1969 | Tweedy | 280/479 R |
| 3,503,456 | 3/1970 | Larson | 172/484 |
| 3,528,685 | 9/1970 | Eastman | 280/461 A |

Primary Examiner—Joseph F. Peters, Jr.
Assistant Examiner—R. Schrecengost
Attorney, Agent, or Firm—Birch, Stewart, Kolasch and Birch

[57] ABSTRACT

A three-point linkage for coupling farm implements to a tractor has two lower links pivoted at their forward ends to a tractor and lie in a plane which from the rear to the front ends of the links is downwardly inclined and the links converge towards a point at or near ground level, and an upper link whose center line converges with the lower links towards the said point. In lieu of a single upper link, a pair of links which diverge from one another as they extend toward the tractor are preferred.

17 Claims, 13 Drawing Figures

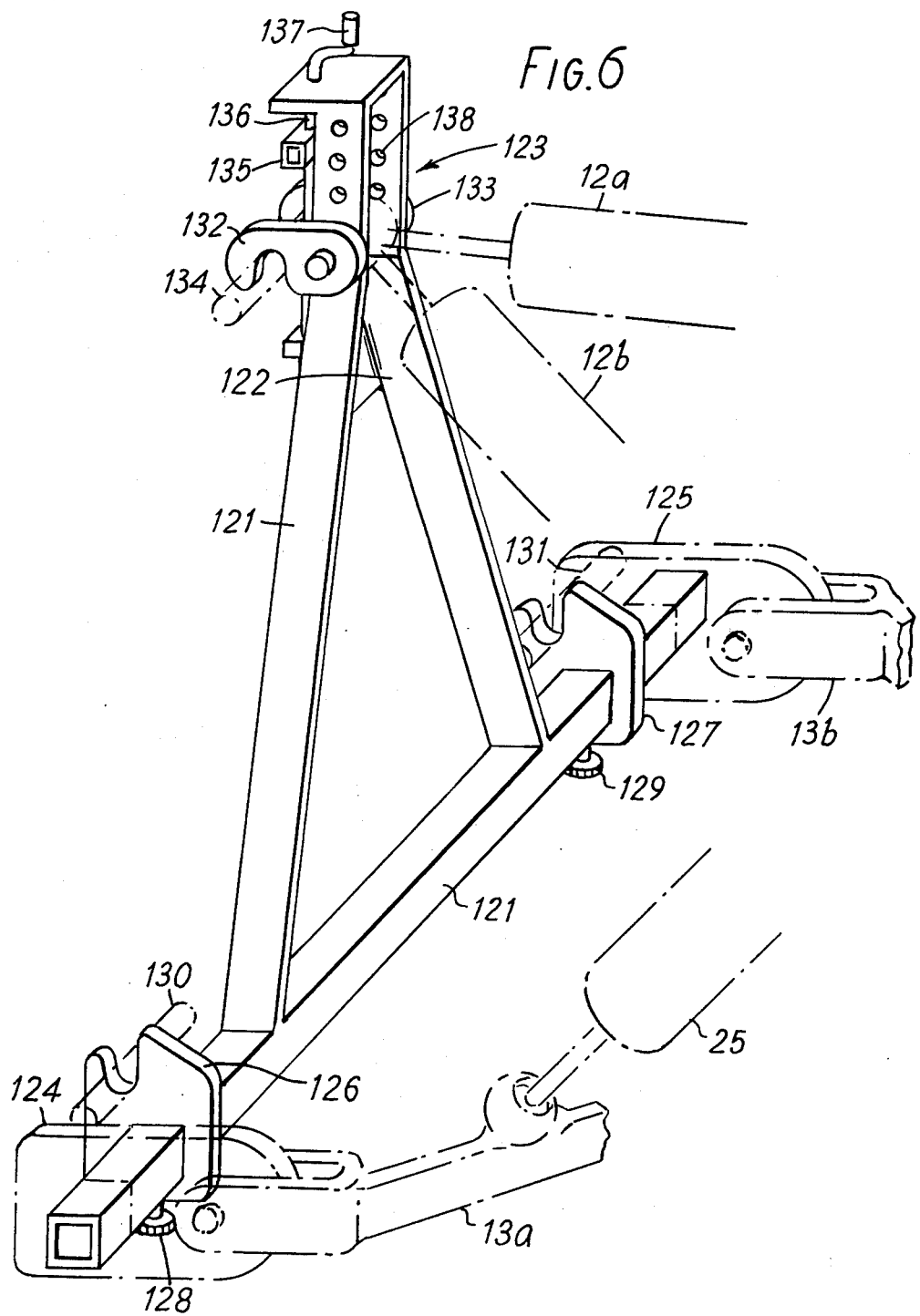

THREE-POINT TRACTOR LINKAGE

This application is a continuation, of copending application Ser. No. 418,041, filed on Nov. 29, 1973 and now abandoned.

BACKGROUND OF THE INVENTION

The present invention relates to tractor linkages, that is linkages for linking an implement to a tractor.

Tractor linkages of varying complexity have been proposed and used for many years. The principal problems to be solved in providing a tractor linkage are firstly the problem arising from an offset load such as an offset plough; secondly, the loading of rear gearboxes of tractors by the linkages; thirdly, allowance for power take-off; fourthly, draught control; track grip; and track wear.

Of recent years there have been developments in what is known as the classic, three-point, tractor linkage and it is to this development that the present invention is directed.

SUMMARY OF THE INVENTION

According to the present invention in one aspect there is provided a three-point linkage for farm implements, comprising two lower links pivotally mounted at their forward ends to a tractor and lying in a plane which, extending from the rearward ends to the forward ends of the two links is downwardly inclined, and the lower links when viewed from above converging towards a point which is at or close to ground level, and upper link means pivotally mounted at its forward end to the tractor and so inclined more steeply than the said plane that its center line converges with the two lower links towards the said point. The tractor may be of the tracked kind or the wheeled kind. When the tractor is of the tracked kind the point to which the links converge is arranged to be not only at or close to ground level but also substantially in the track grip line. Thus it is also in the vertical axis about which, in other arrangements, a swinging draw bar would be connected.

Preferably the upper link means is divided into two parts pivoted to one another at their rearward ends and diverging from one another in the forward direction, the forward ends of the two parts being separately pivoted to the tractor. By inserting a hydraulic ram into each part and controlling the rams appropriately, the upper point of the three-point linkage can be moved as required by swinging it laterally or forwards or backwards or any combination of these to control an implement or, in fact, to control the tractor steering.

Thus the linkage simplifies control and removes the need for a rocker shaft. It allows a swinging draw bar to be retained for use when required. The divided upper link means allows a power take-off to be retained and the power take-off shaft can project through the angle between the two parts of the upper link means. The use of hydraulic rams in the two parts of the upper link means enables the linkage to be locked against lateral swing when no implement is coupled to the linkage. The linkage enables the tractor to be steered by a plough being towed by the tractor, the plough acting as a rudder. It has been found that by such use of the linkage to steer the tractor the output of work per hour can be increased because, on a tracked type of tractor, it is no longer necessary to apply steering brakes. It also reduces fatigue of the driver. Track grip in bad conditions is also found to be increased because the driver does not have to accelerate and brake the tracks for steering purposes and they run much cleaner. Track wear has also been found to be less, because snatching by steering brakes is avoided and because of the cleaner running.

BRIEF DESCRIPTION OF THE INVENTION

The invention will now be described by way of example with reference to the accompanying drawings, in which:

FIG. 6 shows a preferred arrangement for permitting an automatic hitch of the linkage to an implement.

DETAILED DESCRIPTION OF THE INVENTION

Figure 1:
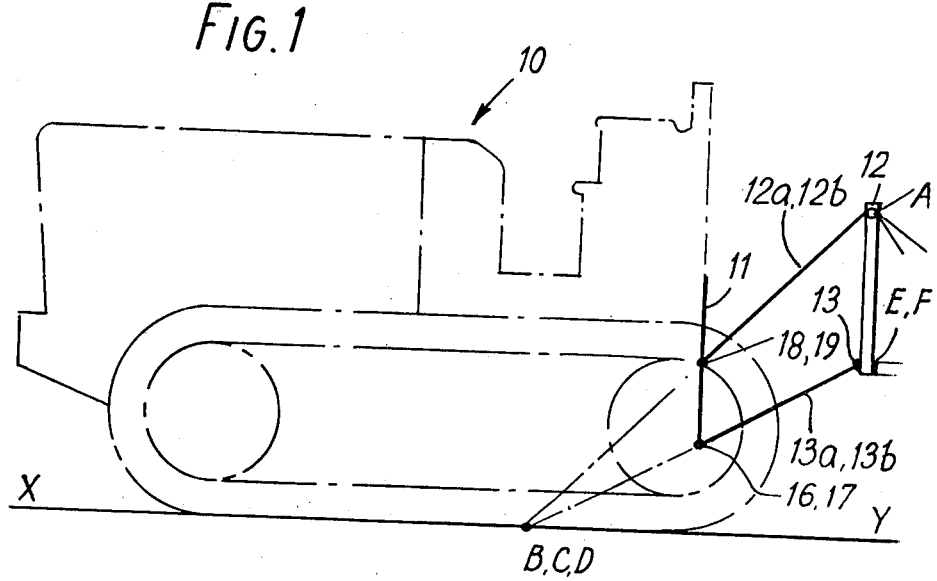
FIG. 1 is a side elevation of a tractor and a linkage according to the invention.
Figure 2:
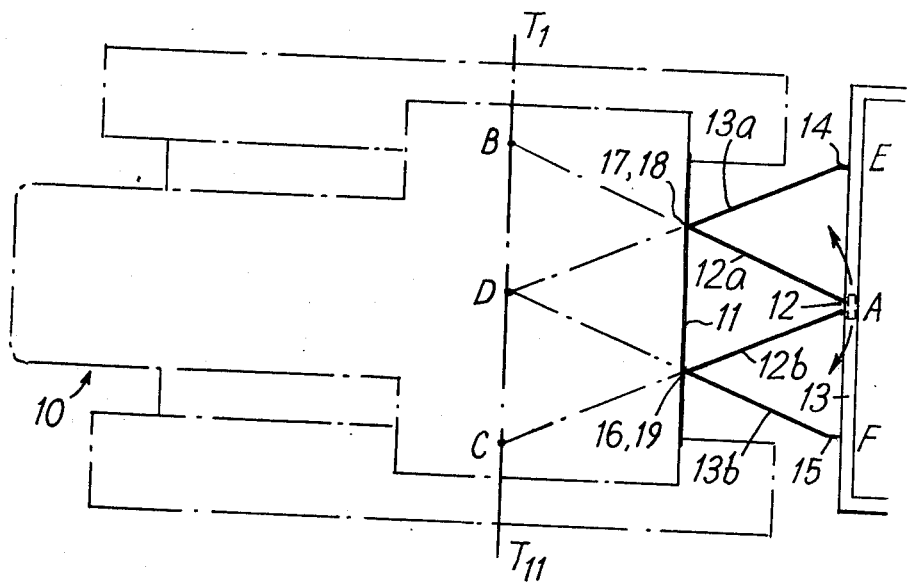
FIG. 2 is a plan view of the tractor and linkage of FIG. 1.

Referring to FIGS. 1 and 2, a tractor shown generally at 10 has attached to its rear body 11 an upper implement hitch pivot 12 and a lower implement hitch pivot 13. The upper implement hitch pivot 12 and the lower implement hitch pivot 13 are attached to the rear body of the tractor 11 through an upper linkage assembly comprising two links 12a, 12b and a lower linkage assembly comprising two lower links 13a, 13b respectively and pivot joints 14, 15, 16, 17, 18 and 19. The two links 12a, and 12b lie in a plane ABC and the lower links 13a, 13b in a plane DEF. The planes ABC, DEF are inclined as shown to the ground plane XY and intersect each other at D in the line $T_1 T_{11}$ which is the "track grip line", that is to say that line on which the tractor when pulling an implement such as a plough or disc harrow is found to concentrate its grip with the ground. This line may often contain the center of gravity of the working assembly of tractor and implement but whether it does or not, the lower links 13a and 13b should ideally converge towards D in $T_1 T_{11}$. It will also be seen that the center line of the upper linkage assembly, that is the line bisecting the angle between the two upper links 12a and 12b converges with the lower links towards the point D. It will be understood that the geometry of FIGS. 1 and 2 is an ideal arrangement and that in practice the intersection line of the planes may fall slightly outside of the line $T_1 T_{11}$ but this must be kept to a minimum by the careful design inter alia of the height of the upper implement hitch pivot A above the ground plane XY; the height of the lower implement hitch pivot joints 14 and 15 above the said ground plane and the positioning of the connecting points of the linkage assemblies, viz. 12a, 12b; 13a, 13b, to the tractor body 11. Indeed, the importance of these heights are noted in British Standard Specifications 1841, 1968 "Attachment of mounted implements to agricultural wheeled tractors"; and 4621, 1970 "Implement headstock for tractor/implement connection by three-point linkage or automatic coupler".

It is to be appreciated that the intersection of the planes as described above ensures that there is no effective change of trim or weight distribution of the tractor and its attachments from its static state. Indeed it provides an arrangement equivalent to the tractor having a draw bar mounted at ground level, yet the ground clearance under the tractor and its attachments is not reduced from an appreciable working clearance, a feature not hitherto achieved in practice.

Figure 4:
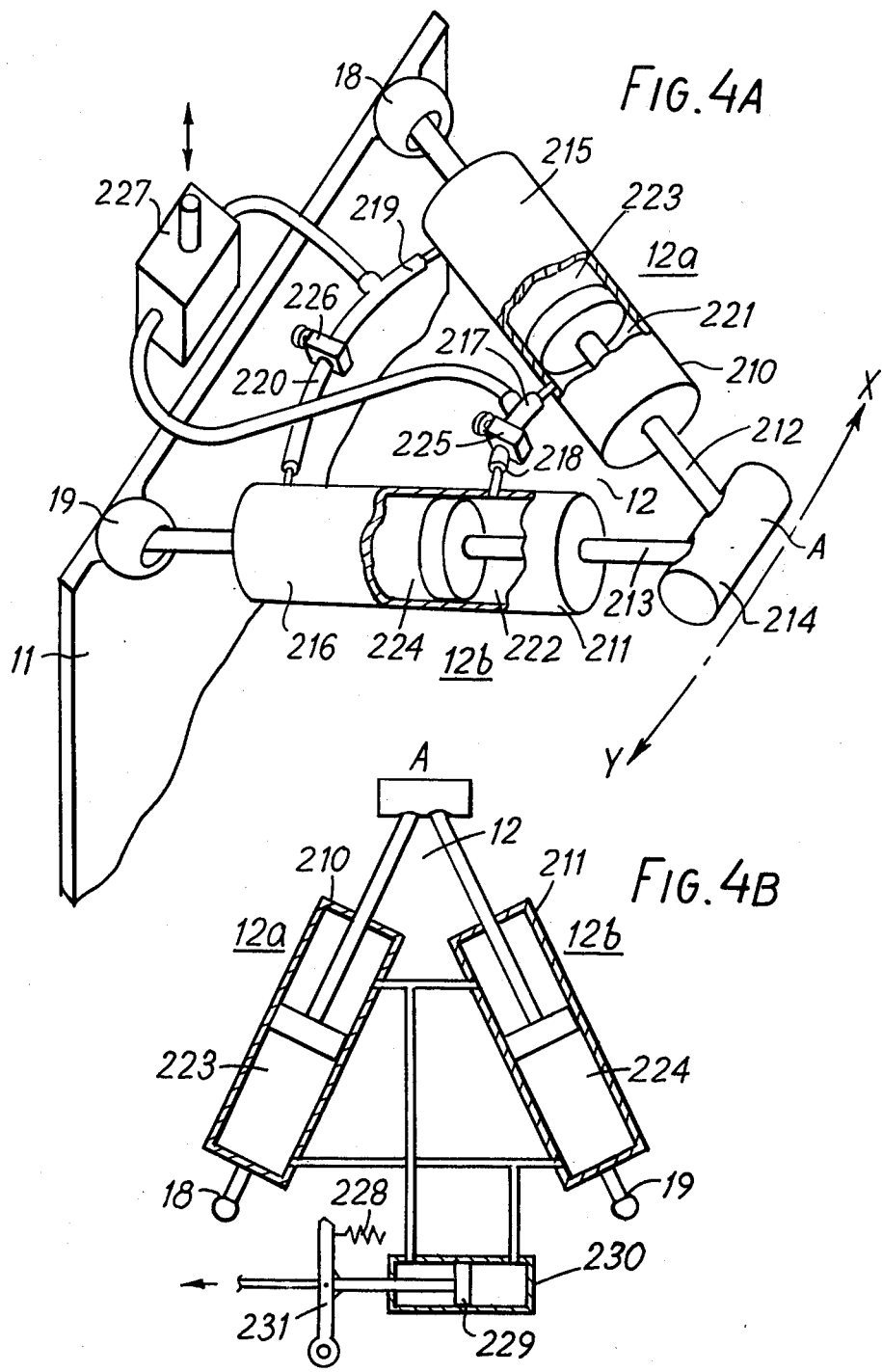
FIGS. 4A and 4B shows a preferred form of top link for use in the arrangement of FIGS. 1 and 2.

A preferred form of the upper linkage assembly is shown in FIGS. 4A and B.

In FIG. 4A the linkage assembly 12 comprises two links 12a and 12b which contain hydraulic rams 210 and 211 respectively. The piston rods 212 and 213 of the rams are pivoted to a common pin 214 and the cylinders 215 and 216 of the rams are pivoted to the rear of the tractor 10 at the pivots 18 and 19.

The cylinders 215 and 216 are provided with hydraulic connections 217, 218, 219 and 220 which interconnect the cavities 221, 222, 223 and 224 of the cylinders. Hydraulic locking valves 225 and 226 are provided in the respective connections between the cavities 221, 222 and 223, 224. A double-acting valve chest 227 supplied with hydraulic fluid under pressure from a hydraulic pump (not shown) is connected as shown to the pairs of cavities 221, 222 and 223, 224.

It will be seen that by setting the valve 227 to deliver hydraulic fluid into the cavities 221, 222 and to return fluid from the cavities 223, 224 to the tank at the pump, the two links 12a and 12b are shortened. If the valve 227 is set to deliver hydraulic fluid to the cavities 223 and 224 and to return fluid from the cavities 221 and 222 to the tank the two links 12a and 12b are lengthened.

If the valve 227 is set to a neutral position, hydraulic fluid can flow between the cavities 221 and 222 and between the cavities 223 and 224. Thus the apex at A is free to move laterally in the direction of the arrows X-Y.

If the valve 227 is set to a neutral position and the locking valves 225 and 226 are closed no fluid can flow in the system and the two links 12a and 12b become rigid.

If the valve 227 is set to allow the flow of fluid between the cavities on opposite sides of the pistons the links 12a and 12b become free to float in the fore and aft direction by being lengthened and shortened, as required.

Figure 3:
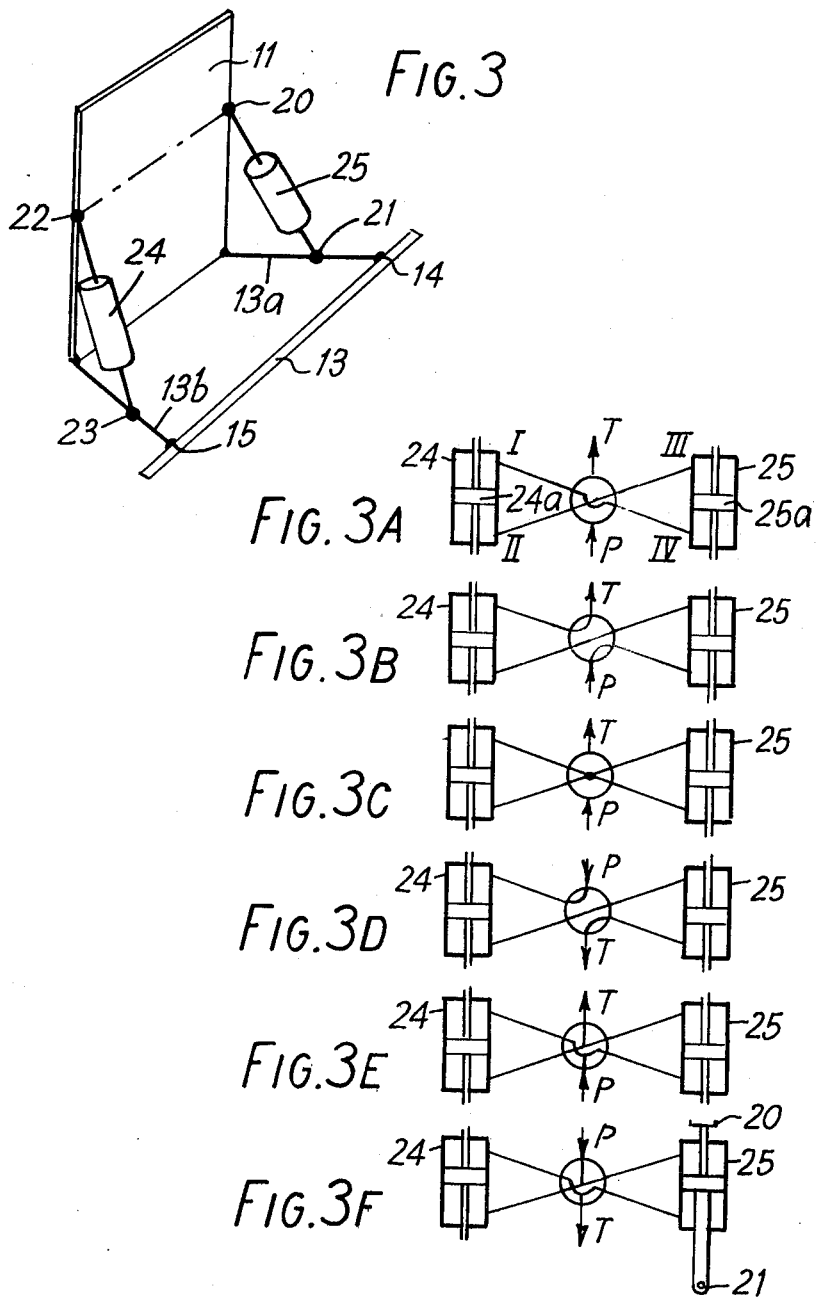
FIG. 3 is a schematic drawing of hydraulics for actuating the linkage of FIGS. 1 and 2, FIGS. 3A to 3F illustrate manipulations which may be obtained with the hydraulic system of FIG. 3.

The links 13a and 13b can be lifted and lowered by hydraulic rams 24, 25 (FIGS. 3 and 6). In a preferred embodiment I make the two lifting and lowering rams 24, 25 for the links 13a, 13b to have cylinders and pistons with identical swept volumes in all four chambers and the two cylinders are so connected that they provide, from the driving seat of the tractor, the following manipulations for the links 13a, 13b of the implement being drawn:

a: float in unison of links 13a, 13b out of the plane DEF, b: lift of links 13a, 13b out of the plane DEF away from the ground plane XY, c: free float or independent float of the links 13a, 13b, d: lowering by free drop or under power of links 13a, 13b out of the plane DEF and toward the ground plane XY, e: controlled tilt of 13a, 13b out of plane DEF to left (e)

f: or right (f) as required.

These manipulations may be achieved by operating the hydraulic circuit as shown in FIG. 3 where the hydraulic cylinders 24 and 25 are linked to the back plate 11 of the tractor at points 20, 22 and to the links 13a, 13b at 21 and 23 respectively. The cylinders 24 and 25 are shown diagrammatically in FIGS. 3A, 3B, 3C, 3D, 3E and 3F with pistons 24a, 25a and ports I, II, III, IV. The pump line to the system is denoted by the letter P and the line to tank by the letter T with appropriate arrows for signifying the direction of the fluid flow. In this manner the manipulations a, b, c, d, e and f referred to above may be obtained from the hydraulic connections shown in FIGS. 3A, 3B, 3C, 3D, 3E and 3F respectively.

Finally, as a special refinement to the linkage of FIGS. 1 and 2, a depth sensing device or draught control for the implement such as a plough being drawn by the tractor is provided. This depth sensing device is shown in FIG. 4B. When the implement being drawn digs into the ground it tends to turn about the lower linkage assembly (13a, 13b of FIGS. 1 and 2) and put the upper linkage assembly (12a, 12b, FIGS. 1 and 2) into compression with a consequent rise in the pressure of the oil in the chambers 223, 224 (FIG. 4B). If now spring 228 is set to a given pressure then, when the pressure in 223 and 224 rises above it the piston 229 in cylinder 230 moves to actuate lever 231 which opens the oil supply to the rams 24, 25, FIG. 3, to lift the lower linkage assembly 13a, 13b and thereby suitably adjust the depth of action of the implement. When the pressure in 223, 224 falls the spring 228 returns the piston 229 to its normal position and the oil supply to rams 24, 25 is cut off and the depth of cut of the drawn implement maintained.

Figure 5:
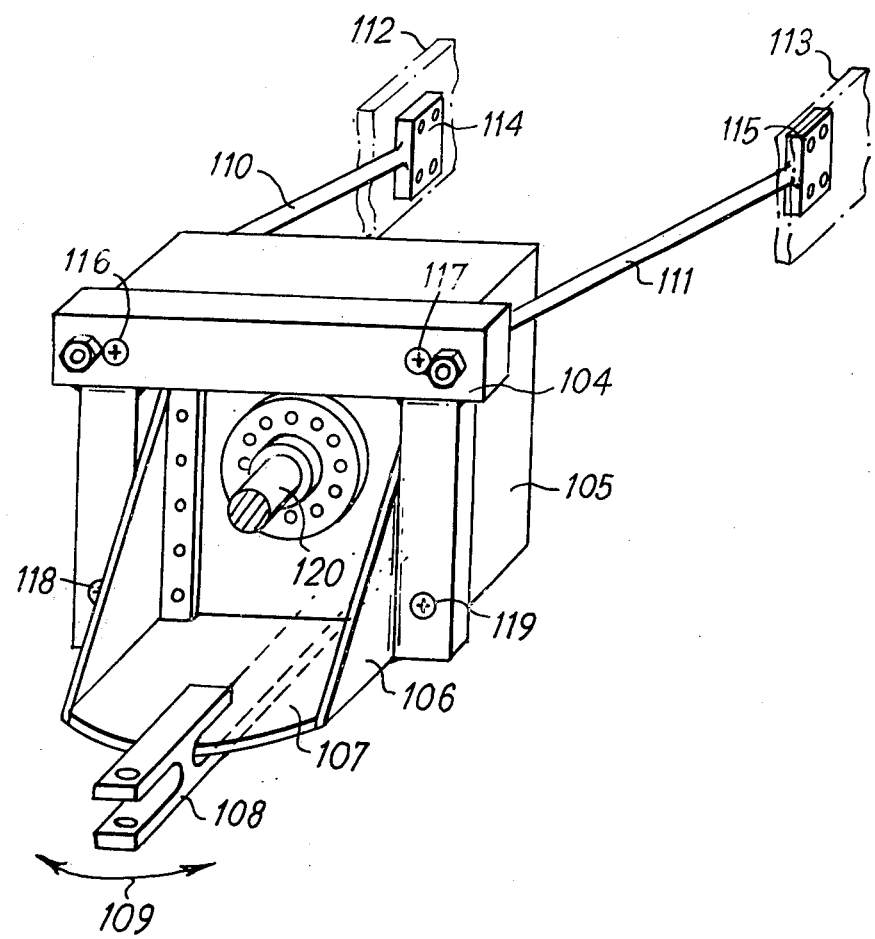
FIG. 5 shows a preferred arrangement for mounting the linkage of FIGS. 4 and 5 on a tractor.

Referring to FIG. 5, this shows a mounting which has been devised whereby a tractor linkage can be mounted on the rear of a tractor in such a way that stress on the rear gearbox can be greatly reduced by transfer of stress to the main longitudinal chassis members of the tractor, a standard pivoted draw bar can be retained when the linkage is attached, and power take-off can be provided to an implement coupled to the tractor by the linkage.

The mounting comprises a yoke 104 mounted at the rearward end of the rear gearbox 105 of a tractor. The gearbox 105 has a frame 106 bolted to its rear face, the frame having two side plates which support a bottom plate 107 having an arcuate rear edge as shown. This rear edge supports the free end of a draw bar 108 and the curvature of this edge allows the draw bar to pivot as indicated by the arrows 109.

The dependent legs of the yoke 104 are welded to the side plates of the frame 106 and the lower edge of the crossbar of the yoke 104 abuts against the rear face of the gearbox 105. The overlap between the gearbox and the crossbar of the yoke to provide this abutment is about half an inch.

The two extremities of the crossbar of the yoke are connected by two tie rods 110 and 111 respectively to the main longitudinal chassis members partly shown at 112 and 113. As shown the tie rods terminate in plates 114 and 115 which are bolted to the chassis members 112 and 113.

A linkage according to the invention is mounted on the yoke 104 at points such as 116, 117, 118 and 119. Because there are two divergent parts to the upper linkage assembly there is no obstruction for a power take-off shaft such as the shaft and universal joint 120. The two upper links are normally in tension and these tensile forces are transmitted through the rods 110 and 111 to the main chassis members 112 and 113 thus relieving the gearbox studs of the considerable stress which is normally applied to them.

Referring now to FIG. 6, this shows an arrangement which has been devised to enable one man to hitch a three-point linkage to an implement. The arrangement comprises a frame including a main tubular member 121 of square cross-section. By means of two struts 121 and 122 welded at their lower ends to the tubular member 121 a head 123 is carried above the member 121.

The tubular member 121 is supported by the links 13a and 13b (shown in broken lines) which are pivoted to members 124 and 125 affixed to the member 121.

Two lower hitch-hooks 126 and 127 are slidably mounted on the tubular member 121 and can be clamped thereto by clamps 128 and 129. By these means the lower hitch-pins such as the pins 130 and 131 of any standard implement can be engaged by the lower hitch-hooks 126 and 127.

The head 123 carries a ball-and-socket universal joint (not visible in FIG. 6) to which the two upper links 12a and 12b are attached. Thus by appropriate operation of the hydraulics in the links 12a and 12b the head can be caused to move forwards and backwards, and left and right.

The head 123 also carries two upper hitch-hooks 132 and 133 which can be brought into engagement with an upper hitch-pin such as the pin 134 of an implement.

When the upper hooks engage the upper hitch-pin a clamp member 135 can be forced down upon the hooks 132 and 133 whereby all four hitch-hooks are firmly held in engagement with the hitch-pins of the implement. For this purpose a rod 136 is screw-threaded through the clamp member 135 and is provided with a handle 137 enabling the driver to operate the clamp.

Thus to hitch the linkage to an implement the driver of the tractor so operates the hydraulics as to lower the member 121 to a low level and to pull the head 123 back towards the tractor. He then reverses the tractor towards the implement until the lower hitch-hooks are underneath the lower hitch-pins of the implement. He then so operates the hydraulic rams 24 and 25 as to bring the lower hitch-hooks into engagement with the lower hitch-pins. The driver then so operates the rams in the links 12a and 12b as to move the head 123 forwardly and click the hooks 132 and 133 over the upper hitch-pin 134. Finally the driver winds down the clamp member 135 by means of the handle 137 until the implement hitch-pins are firmly locked into the upper and lower hooks.

The height of the hooks 132 and 133 can be adjusted by using appropriate pairs of the apertures 138.

Thus, it will be appreciated that the hitch can be used to couple the linkage to implements of all standard categories without adding to or modifying the implements.

In a modification (not shown) of the arrangement of FIG. 6, the upper hitch-hooks are arranged to be substantially longer than shown. The hooks are urged downwardly by a spiral spring coaxial with the spindle of the hooks.

With this modification the rams in the links 12a and 12b are initially urged forwardly to bring the upper hitch-hooks above the upper hitch-pin 134. The rams 24 and 25 (FIG. 3) are then operated to bring the upper hitch-hooks into engagement with the upper hitch-pin 134 and then to rotate the upper hitch-hooks against the spring until the lower hitch-hooks can be moved under the lower hitch-pins 130 and 131. By means of the rams 24 and 25 the lower hitch-hooks can then be brought into engagement with the lower hitch-pins and can be locked to them by any suitable lock such as the automatic spring-loaded locks used on crane hooks.

I claim:

1. A three-point linkage for use in coupling farm implements to a tractor, comprising two lower links from the tractor to the lower points of the linkage, upper link means from the tractor to the upper point of the linkage in the form of two upper links each containing a hydraulic ram, the two upper links diverging from pivots at the upper point to pivots on the tractor, and control means including a valve mechanism interconnecting the cavities of the rams such that the lengths of the two upper links can be caused or permitted to vary by control of the rams such that (a) the upper links can float in unison in the fore and aft direction and (b) the upper point of the linkage can move laterally spontaneously.

2. The three-point linkage of claim 1, wherein said control means further includes means for blocking movement of hydraulic fluid between the cavities of the rams to make the upper links of fixed length.

3. A three-point linkage according to claim 1, including means for pressurizing the rams to force the upper point of the linkage to move laterally.

4. A three-point linkage for farm implements comprising a frame, upper link means extending between a pivot on the frame and a pivot on a tractor, two laterally spaced lower links extending between pivots on the frame and pivots on the tractor, and two hydraulic rams coupled between the rear of the tractor and the two lower links, respectively, the said hydraulic rams having a control-valve mechanism for effecting the following functions:
   a. raising and lowering the rearward ends of the links,
   b. tilting the rearward ends of the links,
   c. floating in unison of the links, and
   d. independent floating of the links.

5. A three-point linkage for farm implements, comprising two lower links pivotally mounted at their forward ends to a tractor and lying in a plane which, proceeding from the rearward ends to the forward ends of the two links is downwardly inclined, and the lower links when viewed from above converging towards a point which is at or close to ground level, and upper link means pivotally mounted at its forward end to the tractor and inclined more steeply than the said plane so that its centerline converges with the two lower links toward the said point, wherein the rearward ends of the links are supported on a frame and two hydraulic rams are coupled between the rear of the tractor and the two lower links, respectively, the said hydraulic rams having control-valve mechanism for effecting the following functions:
   a. raising and lowering the rearward ends of the links,
   b. tilting the rearward ends of the links,
   c. floating the links in unison, and
   d. independently floating the lower links.

6. A three-point linkage according to claim 5, wherein a hitch-mechanism is provided on the frame on which the rearward ends of the lower links and the upper link means are mounted, the hitch-mechanism including two lower, laterally-spaced, upwardly-directed hitch-hooks and an upper, downwardly-directed hitch-hook and means are provided to enable the lower hitch-hooks and the upper hitch-hook to move into engagement with hitch-pins of an implement by a relative movement between the upper hitch-hook and the lower hitch-hooks towards one another.

7. A three-point linkage for farm implements comprising two lower links pivotally mounted at their forward end to a tractor and lying in a plane which, proceeding from the rearward ends to the forward ends of the two links is downwardly inclined, and the lower links when viewed from above converging toward a point which is at or close to ground level, upper link means pivotally mounted at its forward end to the tractor and so inclined more steeply than said plane that its center line converges with the two lower links toward the said point, said upper link means comprising two upper links pivoted relative to one another at their rearward ends and diverging from one another in the forward direction, the forward ends of the two upper links being separately pivoted to the tractor, each of said upper links containing a hydraulic ram and control valve mechanism therefor enabling the upper links to be lengthened and shortened and enabling the upper link means to be swung laterally, and two hydraulic rams coupled between the rear of the tractor and the two lower links, respectively, the said hydraulic rams having a control valve mechanism for effecting the following functions:
   a. raising and lowering of the rearward ends of the lower links,
   b. tilting of the rearward ends of the links,
   c. floating in unison of the links, and
   d. independent floating of the lower links.

8. A three-point linkage for use in coupling farm implements to a tractor, comprising two lower links from the tractor to the lower points of the linkage, two upper links from the tractor to the upper point of the linkage, a double-acting hydraulic ram in each of the upper links, each ram having a first chamber adjacent the tractor and a second chamber adjacent the linkage point, the four chambers of the two double-acting rams all having identical swept volumes, and control means interconnecting the chambers of the rams whereby the length of the upper links can be caused or permitted to vary, said control means comprising first means coupling the two first chambers of the rams and second means coupling the two second chambers of the rams, whereby the upper point of the linkage can swing laterally.

9. A three-point linkage according to claim 8, wherein said control means further includes means for selectively blocking said first and second means to make both the upper links of fixed lengths.

10. A three-point linkage according to claim 8, including means for pressurizing the first chamber of one ram and the second chamber of the other to force the upper point of the linkage to move laterally.

11. A three-point linkage for use in coupling farm implements to a tractor, comprising two lower links from the tractor to the lower points of the linkage, two upper links from the tractor to the upper point of the linkage, a double-acting hydraulic ram in each of the upper links, each ram having a first chamber adjacent the tractor and a second chamber adjacent the linkage point, the four chambers of the two double-acting rams all have identical swept volumes, and control means interconnecting the chambers of the rams whereby the lengths of the upper links can be caused or permitted to vary, said control means including means for selectively coupling the first and second chambers of each ram, whereby the upper point of the linkage is free to float in the fore and aft directions.

12. A three-point linkage for use in coupling farm implements to a tractor, comprising two lower links from the tractor to the lower points of the linkage, two upper links from the tractor to the upper point of the linkage, a double-acting hydraulic ram in each of the upper links, each ram having a first chamber adjacent the tractor and a second chamber adjacent the linkage point, the four chambers of the two double-acting rams all having identical swept volumes, and control means interconnecting the chambers of the rams whereby the length of the upper links can be caused or permitted to vary, said control means including means for delivering fluid into either said first chamber or said second chamber and exhausting fluid from the others of said first and said second chambers to alter the length of said upper links, said control means further enabling the selective coupling of the chambers of the rams as follows:
   a. coupling the two first chambers of the rams and the two second chambers, whereby the upper point of the linkage can swing laterally, and
   b. coupling the first and second chambers of each ram, whereby the upper point of the linkage is free to float in the fore and aft directions.

13. A three-point linkage for use in coupling farm implements to a tractor, comprising two lower links from the tractor to the lower points of the linkage, upper link means from the tractor to the upper point of the linkage in the form of two upper links each containing a hydraulic ram, the two upper links diverging from pivots at the upper point to pivots on the tractor, and control means including a valve mechanism interconnecting the cavities of the rams such that the length of the two upper links can be caused or permitted to vary by control of the rams such that (a) the upper links can float in unison in the fore and aft direction, and (b) the upper point of the linkage can move laterally, spontaneously, said control means further including means for delivering fluid to one of said cavities of each ram and exhausting fluid from the other of said cavities of each ram.

14. A three-point linkage for use in coupling farm implements to a tractor, comprising two lower links from the tractor to the lower points of the linkage, two upper links from the tractor to the upper point of the linkage, a double-acting hydraulic ram in each of the upper links, each ram having a first chamber adjacent the tractor and a second chamber adjacent the linkage point, the four chambers of the two double-acting rams all having identical swept volumes, control means interconnecting the chambers of the rams whereby the lengths of the upper links can be caused or permitted to vary, means for sensing the pressure in the rams, and means for adjusting the height of the linkage in dependence upon the sensed pressure.

15. A three-point linkage for use in coupling farm implements to a tractor, comprising two lower links from the tractor to the lower points of the linkage, said two lower links being pivotally mounted at their forward ends to said tractor and lying in a plane which, proceeding from the rearward ends to the forward ends of the two links is downwardly inclined, and said lower links when viewed from above converging toward a point which is at or close to ground level, upper link means from the tractor to the upper point of the linkage in the form of two upper links each containing a hydraulic ram, the two upper links diverging from pivots at the upper point to pivot on the tractor and being pivotally mounted at its forward end to said tractor and so inclined more steeply than the said plane that its center line converges with the two lower links toward the said point, and control means including a valve mechanism interconnecting the cavities of the ram such that the length of the two upper links can be caused or permitted to vary by control of the rams such that (a) the upper links can float in unison in the fore and aft direction, and (b) the upper point of the linkage can move laterally, spontaneously.

16. A three-point linkage according to claim 15, wherein a hitch-mechanism is provided on a frame on which the rearward ends of the lower links and the upper link means are mounted, the hitch-mechanism including two lower, laterally-spaced, upwardly-directed hitch-hooks and an upper, downwardly-directed hitch-hook and means are provided to enable the lower hitch-hooks and the upper hitch-hook to move into engagement with hitch-pins of an implement by a relative movement between the upper hitch-hook and the lower hitch-hooks towards one another.

17. A three-point linkage for use in coupling farm implements to a tractor, comprising lower link means from the tractor to the lower points of the linkage, two upper links from the tractor to the upper point of the linkage, a double-acting hydraulic ram in each of the upper links, each ram having a first chamber and a second chamber, the four chambers of the two rams all having identical swept volumes, and control means for selectively coupling the chambers of the rams as follows:
 a. coupling the two first chambers of the rams and the two second chambers, whereby the upper point of the linkage can swing laterally;
 b. coupling the first and second chambers of each ram, whereby the upper point of the linkage is free to float in the fore and aft direction; and
 c. blocking fluid movement between the chambers, whereby the rams remain in constant lengths.

* * * * *

UNITED STATES PATENT AND TRADEMARK OFFICE
CERTIFICATE OF CORRECTION

PATENT NO. :     4,059,283
DATED      :     November 22, 1977
INVENTOR(S) :    Peter Alfred SHELTON It is certified that error appears in the above-identified patent and that said Letters Patent are hereby corrected as shown below:

IN THE HEADING OF THE PATENT, under "[22] Filed:" change "Nov. 10, 1975" to --Nov. 11, 1975--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks